Patented May 3, 1938

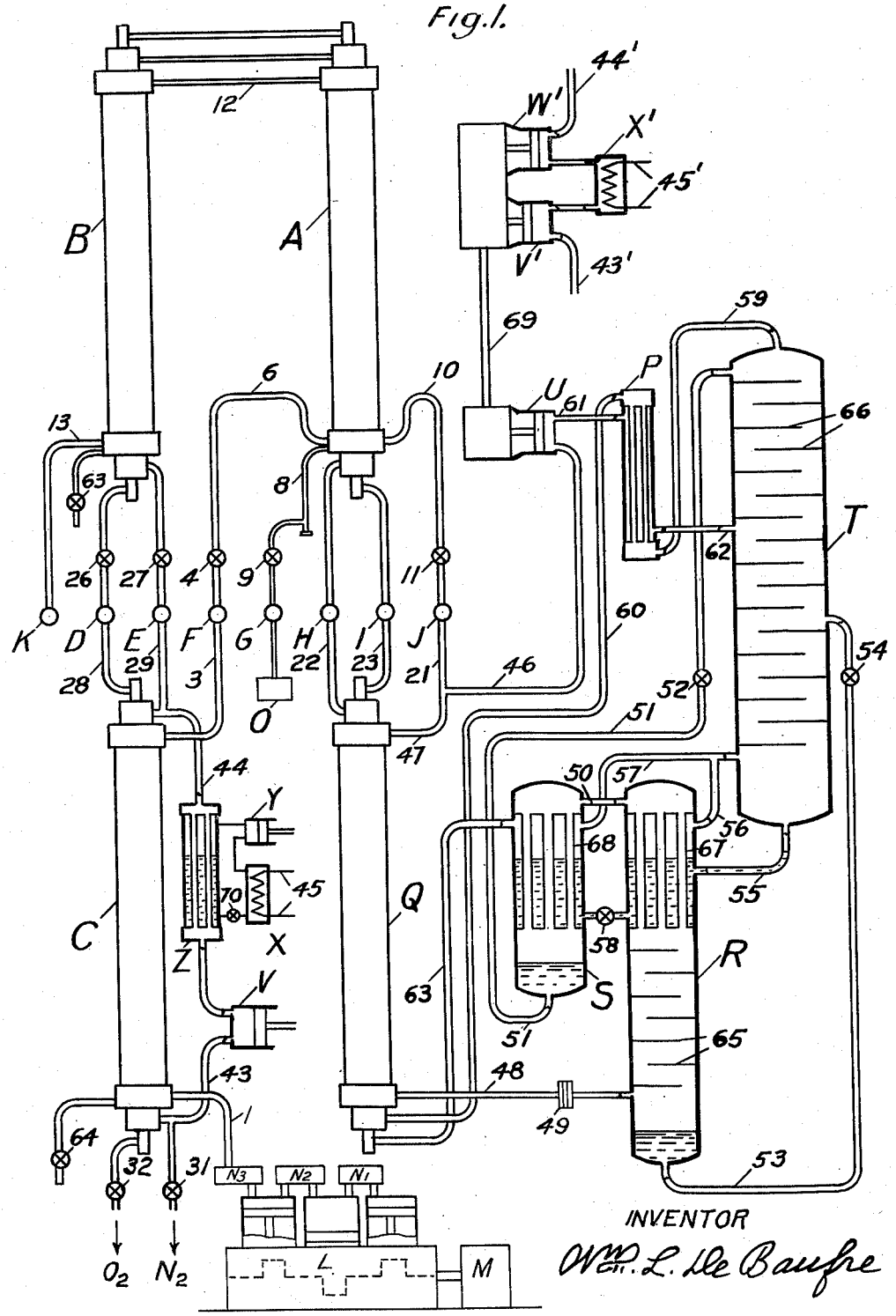

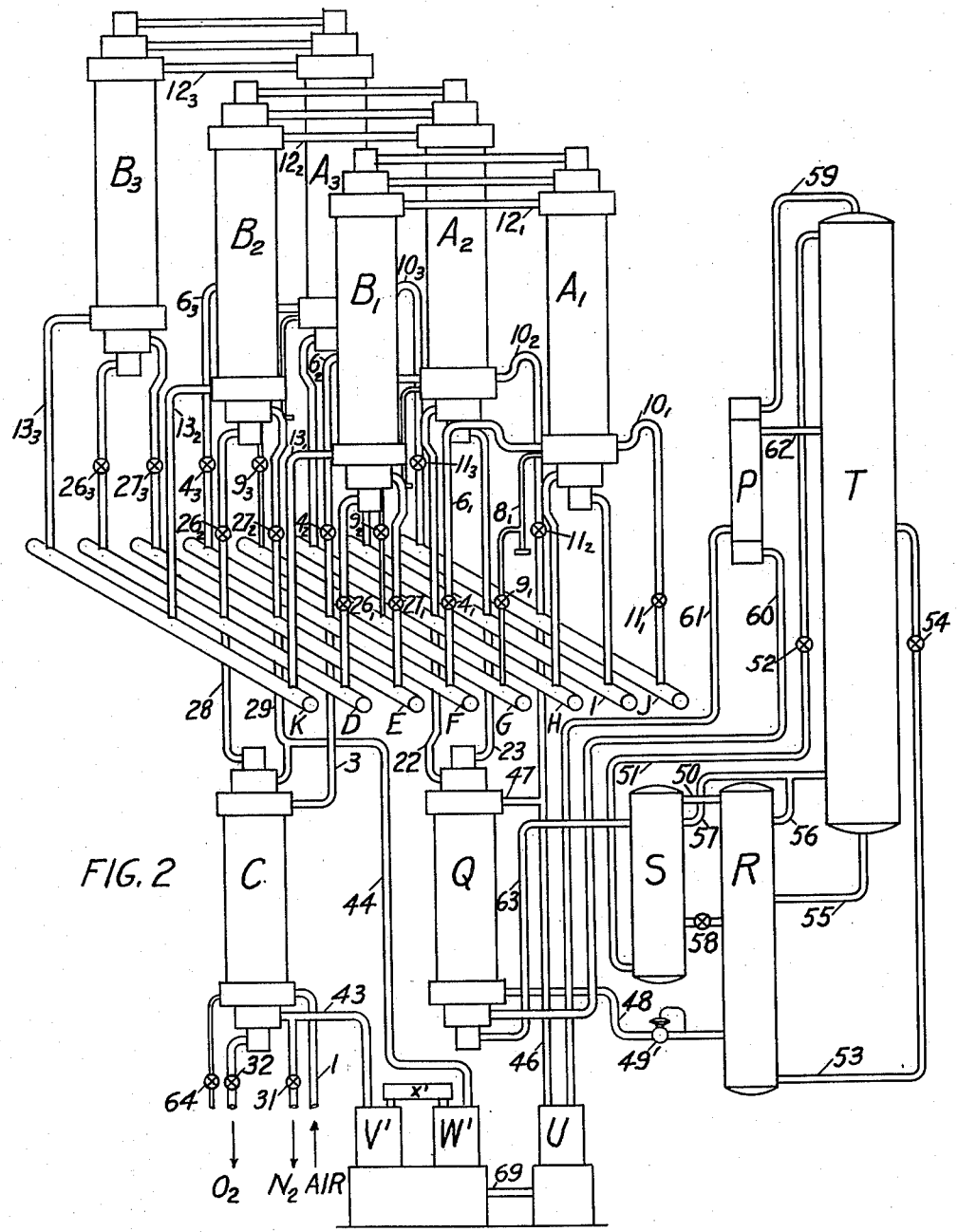

2,116,191

UNITED STATES PATENT OFFICE 2,116,191

METHOD OF AND APPARATUS FOR SEPARATION OF MOIST GASEOUS MIXTURES

William Lane De Baufre, Lincoln, Nebr.

Application March 4, 1935, Serial No. 9,186

25 Claims. (Cl. 62—122)

This invention relates to the art of separating moist gaseous mixtures and is particularly applicable to the separation of atmospheric air containing water vapor. Before atmospheric air can be separated by rectification into more or less pure oxygen and nitrogen, it must first be cooled, the water vapor separating from the "dry gases" in the form of liquid above zero centigrade and in the form of frost below this temperature. As most of the process of cooling and drying and separating atmospheric air must be conducted at temperatures below atmospheric temperature, some method of refrigeration must be employed to cool the apparatus to operating temperatures, to remove the heat that continually leaks into the apparatus during operation and to remove the latent heat of water vapor condensed and frozen within the apparatus. Mechanical power is required for furnishing this refrigeration and for balancing the various thermodynamic losses due to heat transfer, etc.

One object of the present invention is to reduce such mechanical power to a minimum and thereby reduce the initial pressure to which atmospheric air must be compressed before entering a separation unit. This object is accomplished by a novel method of and apparatus for rectifying cooled and dried atmospheric air in combination with a novel system of refrigeration and the cooling method and apparatus for moist gases covered in Patent No. 2,039,889, issued May 5, 1936.

Another object of the present invention is to render systems for separating atmospheric air and other gaseous mixtures below atmospheric temperature, automatic in operation with regard to their general refrigeration requirements. When the refrigeration supplied to such systems is greater or less than the refrigeration requirements under the conditions of operation, liquids within the system increase or decrease in amount. By the method and apparatus described herein, a variation in amount of such liquids automatically produces a change in refrigeration supplied until a balance is reached. Any change in conditions of operation that causes a change in refrigeration requirements which unbalances the system then results automatically in an adjustment of the refrigeration supplied until a new balance is reached.

The foregoing objects, together with such additional and subsidiary advantages as may hereinafter appear or are incident to the invention, are realized by means of the apparatus illustrated in preferred form in the accompanying drawings, wherein Fig. 1 represents the apparatus partly in section and Fig. 2 includes an oblique projection of the arrangement of interchangers proposed. The apparatus shown in the drawings includes:

(1) Multiple stage compressor L driven by motor M with intercoolers $N_1$ and $N_2$ and aftercooler $N_3$ for compressing atmospheric air to 200 to 400 lb. gage and removing the heat of compression.

(2) Exchanger C with auxiliary refrigeration apparatus V, X, Y and Z for cooling compressed moist atmospheric air from room temperature to a temperature somewhat above freezing and for removing most of the moisture therefrom.

(3) Interchanger sections A and B for further cooling the compressed atmospheric air to 100 or more degrees below zero centigrade and completing the removal of moisture therefrom. Interchanger sections A and B are in multiple as shown in Fig. 2 and described in patent application No. 742,869, now matured into Patent No. 2,039,889, issued May 5, 1936, the multiple interchangers being connected to manifolds D, E, F, G, H, I, J and K.

(4) Liquefier Q for partly liquefying a portion of the cooled and dried air.

(5) High pressure rectifier R for rectifying this portion of the cooled and dried air into a nearly pure nitrogen vapor and an oxygen-rich liquid.

(6) Exchanger S for liquefying the nitrogen vapor.

(7) Expansion engine (or turbine) U for expanding a portion of the cooled and dried air to a reduced pressure.

(8) Exchanger P for further cooling the expanded portion of the cooled and dried air and for reducing pressure fluctuations therein.

(9) Low pressure rectifier T for rectifying the expanded air from engine U and the liquids from high pressure rectifier R and exchanger S into more or less pure oxygen and nitrogen, which are then warmed nearly to room temperature by being returned through exchanger P, liquefier Q, interchanger sections A and B, and exchanger C.

Auxiliary refrigeration apparatus V', W' and X' driven by expansion engine U, may be substituted for auxiliary refrigeration apparatus V, X, Y and Z.

The operation of the above listed equipment will be described for separation of atmospheric air into more or less pure oxygen and nitrogen, for which the arrangement shown on the drawings is specially adapted. Various features of the method and apparatus, however, would be advantageous in separating other gaseous mixtures below atmospheric temperature.

The atmospheric air to be separated is first compressed to 200 to 400 lb. per sq. inch by multiple stage compressor L and then cooled approximately to atmospheric temperature in aftercooler $N_3$. Multiple stage compressor L is of the positive displacement type and is driven at substantially constant rotative speed by motor M, thereby supplying compressed air at a substantially constant rate of mass flow. The compressed air enters exchanger C through pipe 1 at about atmospheric temperature, say 30° centigrade. The compressed air contains saturated water vapor at this temperature. The volume of this saturated water vapor is equal to the volume of the compressed air. As this volume is nearly inversely proportional to the compressed air pressure, it is evident that more water vapor would be carried into the separation unit if the compressed air pressure were reduced.

As the compressed air is cooled, water vapor is liquefied until zero centigrade is reached. Below zero centigrade, the remaining water vapor is frozen out of the compressed air and deposited as frost upon the cooling surfaces. In order to effect the condensing and freezing of the water vapor, latent heat must be removed from the water vapor at the temperature of condensation. This requires refrigeration.

Usually, such refrigeration comes from that furnished by expansion at very low temperatures of some of the compressed air processed. This low temperature refrigeration is furnished in order to cool the apparatus to operating temperatures and maintain the system in operation at such temperatures with heat leak into the apparatus from surroundings at atmospheric temperature. Such low temperature refrigeration is much more costly in power requirements than refrigeration at the temperature of condensing most of the water vapor in the compressed air.

Any general improvements in the process which would reduce the low temperature refrigeration requirements for keeping the system in operation, would result in reducing the initial pressure of the compressed air which is expanded to produce the low temperature refrigeration. A reduction in compressed air pressure would, however, increase the volume of the compressed air and hence increase the volume of water vapor carried into the separation unit. This would increase the refrigeration requirements for balancing the latent heat of the water vapor condensed and frozen within the apparatus.

Hence, if general improvements were made in the process which correspond to a reduction in the compressed air pressure from say 400 to 200 lbs. per sq. inch, such reduction in pressure would not result because the refrigeration requirements of the water vapor to be liquefied and frozen out of the compressed air would be nearly doubled. The full advantage of such general improvements in reducing the compressed air pressure would be attained only by providing at the same time auxiliary refrigeration from a separate source for removing the additional moisture in the air to be processed under the lower pressure. Such auxiliary refrigeration should be supplied at the temperature of condensation of the water vapor rather than at a lower temperature.

The greater the general improvements in the process, the more important it is to supply auxiliary refrigeration for removal of water vapor and to supply it at the temperature of such removal. Also, the larger the separation unit, the more important becomes the attainment of the minimum compressed air pressure in order to reduce the cost of power to a minimum.

In the present invention, general improvements are made in the process of separating atmospheric air into nearly pure oxygen and nitrogen in order to reduce the compressed air pressure to a minimum. Attainment of the minimum pressure is assured by applying auxiliary refrigeration to the apparatus in order to compensate for the latent heat of the moisture contained in the compressed air processed. This additional refrigeration is applied at the temperature of condensation of most of the water vapor.

Thus, referring to the drawings, in flowing through exchanger C, the compressed air is cooled not only by returning products of rectification but also by means of the special refrigeration equipment V, X, Y and Z. Within exchanger C, the compressed air is cooled at least to 15° centigrade and preferably somewhat lower. By cooling from 30 to 15° centigrade, about 60 per cent of the water vapor in the compressed air would be liquefied. If cooled from 30 to 0° centigrade, about 85 per cent of the water vapor would be liquefied. If cooled to some intermediate temperature, from two-thirds to three-quarters of the water vapor would be condensed within exchanger C so that this proportion of the total refrigeration required for removal of water vapor from the compressed air could be supplied at the temperature of such removal by applying an auxiliary refrigeration system to exchanger C. As the compressed air continually flows through exchanger C so long as the plant is in operation, exchanger C is in an advantageous place to apply the refrigeration for removal of most of the water vapor.

Exchanger C is mounted in a vertical position so that the compressed air flows upward therein. The condensed water vapor then flows down to the warm end of exchanger C from which it is removed through pipe and valve 64. The arrangement of the auxiliary refrigeration equipment shown for exchanger C will be described later.

The compressed air cooled to a temperature between fifteen and zero degrees centigrade and with more than 60 per cent of its moisture removed, leaves exchanger C through pipe 3 and passes to manifold F. From manifold F, the cooled and partly dried air passes through one of pipes 6 to one of multiple interchanger sections A, as determined by which one of valves 4 is open. Such interchanger section A together with corresponding section B, is defrosted by the compressed air flowing up through section A, through pipe 12, down through section B, and thence through pipe 13 to manifold K. Valves 26 and 27 are closed for these interchanger sections so that the cold products of rectification do not return through the interchanger sections A and B which are being defrosted. Valve 9 is open so that the moisture resulting from defrosting interchanger section A drains to manifold G from which it is removed by trap O. Moisture may be removed from interchanger section B through pipe and valve 63.

From manifold K, the compressed air flows through two or more pipes 13 to the corresponding number of interchanger sections B in which the compressed air is cooled to and below the freezing temperature of water vapor, zero degrees centigrade. It is particularly advantageous for the moist air to flow upwards within interchanger section B so long as the compressed air is above the freezing temperature of water and the water vapor therein is condensing to liquid water. Otherwise, if the air flowed downwards while being so cooled, liquid water would run down to regions where the temperature would be below freezing and would there freeze and clog the interchanger. In interchanger section B, however, the upward flow of the air while being cooled above the freezing temperature of water results in the condensed water vapor flowing down into regions of higher temperature where there is no danger of freezing. Such liquid may be drained through pipe and valve 63.

The compressed air cooled below zero degrees centigrade in two or more interchanger sections B in parallel, flows through pipes 12 to two or more interchanger sections A where the compressed air is further cooled below the freezing temperature of water to below minus 100° centigrade before leaving through pipes 10 to manifold J. Downward flow of compressed air is permissible within interchanger sections A because the small amount of moisture remaining in the compressed air is frozen out and is deposited as frost on the heat transferring surfaces below zero degrees centigrade. Valves 26 and 27 are open to permit products of rectification to return through these interchanger sections A and B in order to cool the compressed air flowing through these interchanger sections. For further details regarding the operation of multiple interchanger sections A and B, see co-pending patent application No. 742,869.

From manifold J, the cooled and dried compressed air divides, one part flowing through pipe 46 to expansion engine (or turbine) U and another part flowing through pipe 47 to liquefier Q. After being further cooled and partly liquefied within liquefier Q by heat exchange with returning products of rectification, the latter part of the compressed air flows through pipe 48 to high pressure rectifier R. Orifice 49 in Fig. 1 or pressure reducing valve 49' in Fig. 2 may or may not be used for reasons which will be explained later.

Within high pressure rectifier R, the rising vapor from the partly liquefied portion of the compressed air is subjected to rectification by a reflux liquid upon trays 65 either at the initial pressure to expansion engine (or turbine) U without pressure orifice 49 or reducing valve 49' or at a somewhat reduced pressure with orifice 49 or pressure reducing valve 49'. This rectification results in an oxygen-rich liquid accumulating at the bottom of high pressure rectifier R and nearly pure nitrogen vapor leaving the top of high pressure rectifier R through pipe 50. This nitrogen vapor is liquefied within exchanger S and accumulates at the bottom thereof.

The oxygen-rich liquid is discharged from high pressure rectifier R through pipe 53 and throttle valve 54 upon an intermediate tray within low pressure rectifier T. The nearly pure nitrogen liquid is discharged from exchanger S through pipe 51 and throttle valve 52 upon the topmost tray within low pressure rectifier T.

The portion of the cooled and dried compressed air which flows through pipe 46 to expansion engine (or turbine) U is there expanded with performance of external work to a reduced pressure and then discharged through pipe 61, exchanger P and pipe 62 into low pressure rectifier T at an intermediate tray. Within low pressure rectifier T, the expanded air is subjected to the previously mentioned nitrogen liquid as a reflux liquid upon trays 66. As a result, an oxygen-rich liquid flows to the bottom of low pressure rectifier T. The oxygen purity of this liquid increases as operation proceeds due to being subjected to an oxygen-rich vapor reflux by vaporization of this liquid.

The oxygen-rich liquid flows through pipe 55 into the space surrounding tubes 67 within the upper part of high pressure rectifier R. There it is partly vaporized by heat exchanger with nitrogen vapor rising from trays 65, thereby condensing some of the nitrogen vapor and thus furnishing the reflux liquid for the rectification within high pressure rectifier R of the partly liquefied compressed air from liquefier Q. The vapor from the partly vaporized oxygen-rich liquid surrounding tubes 67 returns through pipe 56 to low pressure rectifier T where this vapor serves as a reflux vapor for rectification of the oxygen-rich liquid flowing down over trays 66.

The portion of the oxygen-rich liquid not vaporized by heat transfer through tubes 67 flows through pipe and valve 58 into the space surrounding tubes 68 in exchanger S. Due to fractionation by partial vaporization around tubes 67, the oxygen-rich liquid entering the space surrounding tubes 68 contains a greater proportion of oxygen than the original oxygen-rich liquid leaving low pressure rectifier T through pipe 55. The remaining oxygen-rich liquid is completely vaporized within exchanger S. A part of the resulting vapor leaves through pipe 63 as one of the final products of rectification. The remaining vapor returns through pipe 57 to low pressure rectifier T where it augments the vapor reflux for rectification therein.

The oxygen-rich liquid surrounding tubes 67 and 68 will rise to about the same level in both rectifier R and exchanger S. If tubes 67 and 68 are mounted at the same level, the ratio of effective heat transfer surfaces within rectifier R and exchanger S will remain approximately the same when the liquid level varies. This will be true because the effective heat transfer surface is the "wetted" surface of the tubes. Heat transfer is between vapor within the tubes and liquid surrounding them. There is very little heat transfer between vapor within the tubes and vapor surrounding them. Hence, the ratio of the nitrogen condensed within exchanger S to the reflux liquid produced within rectifier R will be substantially independent of the liquid level surrounding tubes 67 and 68.

Within low pressure rectifier T, the oxygen-rich vapor from high pressure rectifier R and exchanger S forms the reflux vapor and the nearly pure nitrogen liquid from exchanger S forms the reflux liquid for rectification of the oxygen-rich liquid from high pressure rectifier R and the expanded air from expansion engine (or turbine) U.

The expanded air from expansion engine (or turbine) U is first passed through exchanger P in contraflow heat exchange with nitrogen vapor from the top of low pressure rectifier T before entering the same. This heat exchange utilizes the low temperature of the nitrogen product of rectification to reduce the expansion engine exhaust substantially to the temperature of liquefaction at the reduced pressure before introducing it into low pressure rectifier T. The back pressure on expansion engine (or turbine) U is substantially equal to the pressure of rectification within low pressure rectifier T by reason of a low pressure drop through exchanger P. Exchanger P also acts to reduce any pressure fluctuations due to intermittent exhaust from expansion engine U, such as would occur with a reciprocating engine.

One advantage of the present system is that the back pressure on expansion engine (or turbine) U is nearly atmospheric, which reduces leakage with a reciprocating engine and is more favorable to the use of a turbine than the high back pressure usually experienced in air separation plants.

Without an orifice 49 or a pressure reducing valve 49' in pipe 48, the pressure of rectification within high pressure rectifier R is substantially equal to the initial compressed air pressure to expansion engine (or turbine) U. The pressure within low pressure rectifier T is but slightly above atmospheric pressure as determined by the resistance to flow of oxygen and nitrogen products of rectification returning through liquefier Q, interchanger sections A and B, and exchanger C. As mentioned above, the pressure within low pressure rectifier T is substantially equal to the back pressure on expansion engine (or turbine) U to which the compressed air pressure is reduced by expansion with performance of external work. For heat transfer through the heat transferring surfaces of tubes 67 and 68 within high pressure rectifier R and exchanger S respectively, there is thus available the temperature difference between the temperature of nearly pure nitrogen (one product of rectification) condensing at the initial pressure to engine U and the temperature of oxygen-rich liquid (other product of rectification) vaporizing at the reduced pressure to which the compressed air is expanded in engine U with performance of external work.

With an initial compressed air pressure of 200 to 400 lbs. per sq. inch and a reduced pressure but slightly above atmospheric pressure, it is evident that a very high temperature difference is available for heat transfer through tubes 67 and 68. This means that but a relatively small area of heat transferring surface is necessary to vaporize all the oxygen-rich liquid flowing through pipe 55 from low pressure rectifier T. Also, due to the high pressure within rectifier R, a relatively small cross-sectional area is sufficient to keep the vapor velocity within a satisfactory value for efficient rectification.

Usually, the expansion engine for the system exhausts into the high pressure rectifier, and the pressure therein is reduced as much as possible by providing extensive heat transfer surfaces between the high and low pressure stages of rectification in order to get the greatest possible refrigerating effect from the expansion engine. By exhausting the expansion engine into low pressure rectifier T as herein proposed, the above objection to higher pressures within the first stage of rectification is removed. But instead of making the pressure within the high pressure stage of rectification depend upon heat transfer between the two stages, the pressure within the high pressure rectifier is maintained substantially equal to or at a constant ratio to the initial pressure of the compressed air to the expansion engine or is maintained substantially constant. This difference in the method of operation results in an automatic balance between the refrigeration requirements of the system and the refrigeration produced by expansion of the compressed air in expansion engine (or turbine) U with performance of external work.

In the case where the pressure within high pressure rectifier R is substantially equal to the initial pressure of the compressed air to expansion engine (or turbine) U, orifice 49 or pressure reducing valve 49' would not be provided in pipe 48. Suppose the system to be operating steadily with a certain liquid level within high pressure rectifier R and exchanger S. Then suppose the refrigeration requirements of the system to change, say by reason of a variation in room temperature. If the liquid levels in the bottoms of rectifier R and exchanger S are maintained constant by regulating valves 54 and 52 respectively, the change in refrigeration requirements will result in a variation of the level of the liquid surrounding tubes 67 and 68. Assume that the refrigeration requirements for the system have decreased so that the expansion engine (or turbine) produces more refrigeration than necessary. The level of the liquid surrounding tubes 67 and 68 will then rise.

With a rise in liquid level, the effective heat transferring surface will be increased. More heat will be transferred to the oxygen-rich liquid surrounding tubes 67 and 68 from the nearly pure nitrogen vapor within these tubes with the same temperature difference between liquid and vapor. Consequently, more nitrogen vapor will be condensed within tubes 67 and 68. Since the rate of supply of compressed air to the system will remain substantially constant with a constant speed compressor, the increased rate of condensation within tubes 67 and 68 will reduce the pressure within high pressure rectifier R and the initial pressure to expansion engine (or turbine) U. Less compressed air will be expanded through the expansion engine or turbine. Consequently, less refrigeration will be produced and the system will eventually come into balance again as to its refrigeration requirements with a higher liquid level surrounding tubes 67 and 68 than previously existed. This balance will be automatically reached with any variation in the system within reasonable limits that may be due to changes either in the refrigeration required by the apparatus or the refrigeration produced by the expansion engine or turbine.

The same automatic balancing of refrigeration required and supplied would also occur if a turbocompressor rather than a reciprocating (positive displacement) type of compressor were used, except that the initial pressure of the compressed air would not fall so greatly with an increased rate of condensation within high pressure rectifier R and exchanger S. The automatic balance would then result from an increase in refrigeration requirements due to more air being processed as well as or rather than a decrease in refrigeration supplied by the expansion engine or turbine.

Such automatic balance would also result if pressure reducing valve 49' in Fig. 2 were inserted in pipe 48 so as to maintain a constant pressure within high pressure rectifier R. Any unbalance between refrigeration required and refrigeration produced would cause a change in level of the liquid surrounding tubes 67 and 68, assuming valves 52 and 54 were regulated to maintain the two other liquid levels constant. This would vary the rate of condensation within rectifier R and exchanger S under constant pressure. The resulting variation of flow through pressure reducing valve 49' would vary the initial compressed air pressure to expansion engine (or turbine) U until a new balance was reached.

An orifice 49 as shown in Fig. 1 would not change this automatic feature of the system. The pressure within high pressure rectifier R would then fluctuate with the initial compressed air pressure to the expansion engine instead of being constant. The orifice would interpose a fixed resistance to flow of the portion rectified in rectifier R from the initial pressure to the rectification pressure, so that any change in the rectification pressure due to variation in rate of condensation within rectifier R would produce a proportionate variation in the initial pressure.

The advantage of operating the high pressure rectifier R at a pressure somewhat lower than the initial compressed air pressure to expansion engine (or turbine) U is that there is a greater spread in composition between the compositions of liquid and vapor mixtures of oxygen and nitrogen in equilibrium at any one temperature as the pressure is reduced. Consequently, a given number of plates is more effective in a rectifier at low pressure than at high pressure. Also, a rectifier designed for operation at low pressure may have less weight than one designed for operation at high pressure and therefore respond more rapidly to changes in operating conditions.

With either a reducing valve 49' or an orifice 49 in pipe 48 so that the pressure within high pressure rectifier R is lower than the compressed air pressure from liquefier Q, it would be advantageous to pass the compressed air from liquefier Q through tubes immersed in the liquid in the bottom of high pressure rectifier R before passing the compressed air through the reducing valve or the orifice. This would produce a vapor reflux within high pressure rectifier R and thereby increase its effectiveness, as claimed in application 738,181, filed August 3, 1934.

The external work of expansion engine (or turbine) U is usually utilized to generate electricity which is wasted in rheostats. It is proposed to apply this external work to the useful purpose of driving the auxiliary refrigeration apparatus provided for balancing the latent heat of the water vapor condensed in exchanger C. This may be done by a direct mechanical connection as represented by shaft 69 or through electrical means. In the latter case, the auxiliary refrigeration apparatus would be operated by electric motors, the electric current for which would be derived from an electric generator driven by expansion engine (or turbine) U. This auxiliary refrigeration apparatus will now be described in detail.

The auxiliary refrigeration apparatus V', W' and X' may be substituted for apparatus V, X, Y and Z. In either case, the nitrogen product of rectification leaving through pipe 31 is recooled and returned to pipe 29 so that it again flows through exchanger C where two-thirds to three-quarters of the water vapor originally in the compressed air is condensed. In this way, the auxiliary refrigeration for condensation of water vapor is applied at the temperature at which condensation occurs rather than drawing upon the low temperature refrigeration of the separation process.

For the auxiliary refrigeration equipment shown to the right of exchanger C, Z is an exchanger containing liquid refrigerant. The nitrogen to be cooled flows through tubes immersed in the liquid refrigerant. Flow of nitrogen is produced by compressor V. As the nitrogen is cooled, liquid refrigerant is vaporized. The resulting vapor is withdrawn by compressor Y and compressed to a higher pressure at which it is liquefied by cooling water flowing through pipes 45 and the coil within cooler X. The liquefied refrigerant is throttled into exchanger Z through throttle valve 70 which may be automatic in operation. Compressors V and Y are both driven by expansion engine (or turbine) U, either mechanically or electrically.

For the auxiliary refrigeration equipment shown as driven by shaft 69, V' is a compressor for compressing the nitrogen to be cooled. The compression raises the temperature of the nitrogen which is then recooled to room temperature in cooler X' by cooling water flowing through pipes 45' and the coil shown therein. The cooled compressed nitrogen is then expanded through engine W'. This expansion reduces the temperature of the nitrogen below room temperature so that it is suitably cooled for returning through exchanger C commingled with the nitrogen product of rectification. The nitrogen product of rectification is particularly suitable for direct cooling by expansion in this manner by reason of its freedom from water vapor when returning from the rectifier.

Means for discharging gases non-condensable at existing temperatures and means for withdrawing unevaporated oxygen from exchanger S have not been shown in order to keep the drawings simple. This could be done as described in previous patent applications.

In the operation of the system shown on the drawings, valves 31 and 32 would be adjusted to maintain the desired proportions of the products of rectification. Valves 52 and 54 would be adjusted to maintain nearly constant liquid levels in the bottoms of high pressure rectifier R and exchanger S. Expansion engine (or turbine) U would have a steady load including the auxiliary refrigeration equipment for balancing the latent heat of most of the water vapor carried into the system at the temperature of such condensation. The latter would be adjusted to give a reasonable amount of auxiliary refrigeration. Any changes in refrigeration requirements for the system as a whole would then be automatically cared for as previously described. Multiple interchanger sections A and B would be operated as described in copending patent application No. 742,869. Certain features shown and described in this application are claimed in co-pending application Serial No. 738,181 filed August 3, 1934.

Having described the arrangement and operation of my novel system of separating moist gaseous mixtures, I claim:

1. An apparatus for rectifying a compressed moist gaseous mixture including an exchanger for cooling and partly drying said gaseous mixture above the freezing temperature of water by returning products of rectification, means for further cooling and drying said gaseous mixture below the freezing temperature of water by returning products of rectification, an expander for expanding a portion of the cooled and dried gaseous mixture to a reduced pressure with performance of external work, a liquefier for further cooling and partly liquefying another portion of said gaseous mixture by heat exchange with returning products of rectification, a high pressure rectifier and exchanger for separating the partly liquefied air into two liquids one richer in one constituent and the other richer in another constituent of said gaseous mixture, a low pressure rectifier for rectifying the two liquids from the high pressure rectifier and the exchanger and the expanded portion of said gaseous mixture into two products of rectification, means for returning said products through said liquefier and said means for cooling said gaseous mixture, means for discharging the expanded portion of said gaseous mixture from said expander into said low pressure rectifier at said reduced pressure whereby the efficiency of the system is raised and the pressure of said compressed moist gaseous mixture is reduced and more moisture is carried into said exchanger, and auxiliary refrigeration apparatus for supplying refrigeration to said exchanger to balance the increased latent heat of said moisture.

2. An apparatus for separating a gaseous mixture below room temperature and requiring refrigeration for the operation thereof, including an expander for expanding a gas at low temperature with performance of external work and thereby supplying refrigeration to said apparatus, a vessel within said apparatus for accumulation of liquefied gas therein, and means for automatically varying the ratio of the refrigeration supplied by said expander to the refrigeration required by said apparatus in accordance with the level of said liquefied gas in said vessel, whereby the refrigeration supplied by said expander is brought into balance with the refrigeration required by said apparatus.

3. An apparatus for rectifying a compressed moist gaseous mixture as in claim 1 including means for driving said auxiliary refrigeration apparatus by said expansion engine.

4. An apparatus for rectifying a moist gaseous mixture, including multiple interchangers in parallel, each interchanger comprising two sections joined by piping at their upper ends, a manifold joined by piping to the lower end of one section of each interchanger, means for admitting said moist gaseous mixture into the lower end of the other section of one of said interchangers, means for withdrawing said gaseous mixture after being cooled and dried from the lower ends of the other sections of the remaining said interchangers, means for rectifying said gaseous mixture, and means for returning the products of rectification through both sections of the remaining said interchangers whereby said moist gaseous mixture is cooled and dried therein.

5. An apparatus for rectifying a moist gaseous mixture, including an exchanger for cooling said gaseous mixture above the freezing temperature of water by returning products of rectification, multiple interchangers in parallel for cooling said gaseous mixture below the freezing temperature of water by returning products of rectification, and means for supplying to said exchanger additional refrigeration to balance the latent heat abstracted in condensing water vapor therein.

6. An apparatus for separating a compressed moist gaseous mixture below room temperature, including an expansion engine for expanding a portion of said gaseous mixture and supplying refrigeration to said apparatus, auxiliary refrigeration equipment for supplying additional refrigeration to said apparatus at the temperature at which moisture is condensed from said gaseous mixture and means for driving said auxiliary refrigeration equipment by said expansion engine.

7. An apparatus for separating a compressed moist gaseous mixture below room temperature as in claim 6 wherein said auxiliary refrigeration equipment comprises means for withdrawing a portion of one of the separated gases and returning the same to said apparatus, an exchanger for cooling said portion of one of the separated gases by heat exchange with a liquid refrigerant, a compressor for compressing vaporized refrigerant from said exchanger, a condenser for liquefying compressed refrigerant and an expansion valve for returning liquefied refrigerant to said exchanger.

8. An apparatus for separating a compressed moist gaseous mixture below room temperature as in claim 6 wherein said auxiliary refrigeration equipment comprises means for withdrawing and compressing a portion of one of the separated gases from said apparatus, a cooler for cooling the compressed gas, an expander for expanding and further cooling said compressed gas, and means for returning the same to said apparatus.

9. An apparatus for separating a compressed gaseous mixture below room temperature and requiring refrigeration for the operation thereof, including an expansion engine for expanding a portion of said gaseous mixture and supplying refrigeration to said apparatus, a vessel within said apparatus for accumulation of liquefied gaseous mixture therein, and means for automatically varying the ratio of the refrigeration supplied by said engine to the refrigeration required by said apparatus in accordance with the level of said liquefied gaseous mixture in said vessel, whereby the refrigeration supplied by said engine is brought into balance with the refrigeration required by said apparatus.

10. An apparatus for rectifying a compressed gaseous mixture, including an expansion engine for expanding one portion of said gaseous mixture from an initial pressure to a reduced pressure with performance of external work, a high pressure rectifier for rectifying another portion of said gaseous mixture, a low pressure rectifier for subsequently rectifying both portions of said gaseous mixture at said reduced pressure, heat exchange surface between liquid from said low pressure rectifier and vapor from said high pressure rectifier, and means whereby an increase of liquid on one side of said surface will increase the proportion of said gaseous mixture rectified in said high pressure rectifier and decrease the proportion of said gaseous mixture expanded by said expansion engine.

11. An apparatus for rectifying a compressed gaseous mixture as in claim 10 including a pressure reducing valve ahead of said high pressure rectifier whereby a constant pressure is maintained therein.

12. An apparatus for rectifying a compressed gaseous mixture as in claim 10 including an orifice ahead of said high pressure rectifier whereby the pressure within said high pressure rectifier is less than the initial pressure to said expansion engine but varies in proportion thereto.

13. An apparatus for rectifying a compressed gaseous mixture, including an expansion engine for expanding one portion of said gaseous mixture from an initial pressure to a reduced pressure, a liquefier for partly liquefying and a high pressure rectifier for rectifying another portion of said gaseous mixture, a low pressure rectifier for subsequently rectifying both portions of said gaseous mixture at said reduced pressure, an exchanger for cooling the expanded portion from said expansion engine before introducing the same into said low pressure rectifier and means for passing products of rectification through said liquefier in heat exchange with said other portion of said gaseous mixture.

14. An apparatus for rectifying a compressed gaseous mixture as in claim 13, including means for passing a product of rectification through said exchanger in heat exchange with said expanded portion of said gaseous mixture.

15. A method of rectifying a compressed gaseous mixture which includes supplying the compressed gaseous mixture at a substantially constant rate of mass flow with variation in initial pressure, dividing the mass flow into two portions at said initial pressure, expanding one portion from said initial pressure to a reduced pressure with performance of external work, rectifying a second portion at said initial pressure, then rectifying both portions at said reduced pressure, and vaporizing liquid from the rectification of both portions by heat transfer to vapor from the rectification of the one portion whereby change in the rate of heat transfer due to variation in accumulated liquid results in variation of said initial pressure to bring the refrigeration produced by expansion into balance with the refrigeration requirements of the process.

16. A method of rectifying a compressed gaseous mixture which includes cooling said compressed gaseous mixture at an initial pressure by heat exchange with returning products of rectification, subsequently dividing the cooled compressed gaseous mixture into two portions, expanding one portion of the cooled compressed gaseous mixture from said initial pressure to a reduced pressure with performance of external work, rectifying a second portion of the cooled compressed gaseous mixture at said initial pressure, then rectifying both portions of said gaseous mixture at said reduced pressure into two products of rectification, and returning both products of rectification in heat exchange with said compressed gaseous mixture in cooling the same before dividing into two portions.

17. A method of rectifying a compressed gaseous mixture as in claim 16 wherein the second portion of the cooled compressed gaseous mixture is further cooled by heat exchange with returning products of rectification after being divided from the portion expanded and before being rectified at said initial pressure.

18. A method of rectifying a compressed gaseous mixture which includes dividing the compressed gaseous mixture into two portions at an initial pressure, expanding one portion of the compressed gaseous mixture from said initial pressure to a reduced pressure with performance of external work, rectifying another portion of the compressed gaseous mixture at an intermediate pressure, then rectifying both portions of the gaseous mixture at said reduced pressure, and maintaining said intermediate pressure substantially constant by automatically regulating the flow of the portion rectified from said initial pressure to said intermediate pressure.

19. A method of rectifying a compressed gaseous mixture which includes cooling said compressed gaseous mixture by heat exchange with returning products of rectification, subsequently dividing the cooled compressed gaseous mixture into two portions, expanding one portion of the cooled compressed gaseous mixture from an initial pressure to a reduced pressure with performance of external work, rectifying a second portion of the cooled compressed gaseous mixture at an intermediate pressure, maintaining said intermediate pressure constant and higher than said reduced pressure, and then rectifying both portions of said gaseous mixture at said reduced pressure.

20. A method of rectifying a compressed gaseous mixture as in claim 19 wherein the second portion of the cooled compressed gaseous mixture is further cooled by heat exchange with returning products of rectification after being divided from the portion expanded and before being rectified at said intermediate pressure.

21. An apparatus for rectifying a compressed gaseous mixture, including an expansion engine for expanding one portion of said gaseous mixture from an initial pressure to a reduced pressure with performance of external work, a high pressure rectifier for rectifying another portion of said gaseous mixture at an intermediate pressure, a low pressure rectifier for subsequently rectifying both portions of said gaseous mixture at said reduced pressure, and a fixed resistance to flow of the portion rectified at an intermediate pressure from said initial pressure to said intermediate pressure whereby said initial pressure is substantially higher than said intermediate pressure and varies in proportion to said intermediate pressure.

22. A method of rectifying a compressed gaseous mixture which includes cooling said compressed gaseous mixture by heat exchange with returning products of rectification, subsequently dividing the cooled compressed gaseous mixture into two portions, expanding one portion of the cooled compressed gaseous mixture from an initial pressure to a reduced pressure with performance of external work, rectifying a second portion of the cooled compressed gaseous mixture at an intermediate pressure which is substantially lower than said initial pressure, varying said initial pressure in proportion to said intermediate pressure, and then rectifying both portions of said gaseous mixture at said reduced pressure.

23. A method of rectifying a compressed gaseous mixture as in claim 22 wherein the second portion of the cooled compressed gaseous mixture is further cooled by heat exchange with returning products of rectification after being divided from the portion expanded and before being rectified at said intermediate pressure.

24. A method of rectifying a compressed gaseous mixture which includes expanding one portion of said gaseous mixture from an initial pressure to a reduced pressure with performance of external work, rectifying another portion of said gaseous mixture at a pressure above said reduced pressure, subsequently rectifying both portions of said gaseous mixture at said reduced pressure, reducing the temperature of the expanded portion of said gaseous mixture before rectifying the same by heat exchange with a product of said low pressure rectification, and then utilizing said product to cool said gaseous mixture.

25. A method of rectifying a compressed gaseous mixture which includes expanding a portion of said compressed gaseous mixture with performance of external work to supply the refrigeration required in the process, accumulating liquids in said process, and automatically varying the proportion of said portion expanded in accordance with the level of said liquids accumulated in said process.

WILLIAM LANE DE BAUFRE.